US011590927B2

(12) United States Patent
Park

(10) Patent No.: US 11,590,927 B2
(45) Date of Patent: Feb. 28, 2023

(54) SYSTEM AND METHOD FOR PROTECTING PEDESTRIAN UPON A COLLISION WITH A VEHICLE

(71) Applicant: HYUNDAI MOBIS CO., LTD., Seoul (KR)

(72) Inventor: Byung Hyuk Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/314,303

(22) Filed: May 7, 2021

(65) Prior Publication Data

US 2021/0354655 A1 Nov. 18, 2021

(30) Foreign Application Priority Data

May 12, 2020 (KR) .................. 10-2020-0056440

(51) Int. Cl.
*B60R 21/38* (2011.01)
*B60R 21/0134* (2006.01)
(Continued)

(52) U.S. Cl.
CPC .......... *B60R 21/38* (2013.01); *B60R 21/0132* (2013.01); *B60R 21/0134* (2013.01); *B60R 21/0136* (2013.01); *B60R 2021/01322* (2013.01)

(58) Field of Classification Search
CPC ... B60R 21/38; B60R 21/013; B60R 21/0132; B60R 21/0134; B60R 21/0136;
(Continued)

(56) References Cited

U.S. PATENT DOCUMENTS 11,338,762 B2 * 5/2022 Cho .................... B60R 21/0132
2002/0093180 A1 * 7/2002 Breed ..................... G01S 15/88
280/730.1
(Continued)

FOREIGN PATENT DOCUMENTS

CN 104228754 A * 12/2014
DE 102004050512 A1 6/2005
(Continued)

OTHER PUBLICATIONS

Examination Report dated Jul. 4, 2022 in the corresponding German Patent Application No. 102021112158.2.

*Primary Examiner* — James A English
*Assistant Examiner* — Scott F. Underwood
(74) *Attorney, Agent, or Firm* — NovoTechIP International PLLC

(57) ABSTRACT

Provided are an apparatus for protecting a pedestrian and a control method thereof. The apparatus for protecting a pedestrian includes a front object detection unit configured to detect an object in front of a vehicle; a collision detection unit configured to detect a collision of a vehicle; a protection module driving unit configured to drive a protection module for protecting a pedestrian when the pedestrian collides with the vehicle; and a control unit configured to determine the front object as a hood lift target on the basis of a detection result of the front object detection unit, to determine the collision as a hood lift target collision on the basis of a detection result of the collision detection unit, and to operate the protection module driving unit in case of the hood lift target collision of the hood lift target.

12 Claims, 4 Drawing Sheets

(51) Int. Cl.
  *B60R 21/0132* (2006.01)
  *B60R 21/0136* (2006.01)
(58) Field of Classification Search
  CPC .................. B60R 21/34; B60R 21/36; B60R 2021/01322; B60R 2021/003; B60R 2021/01013; B60R 19/483; B60W 40/02; B60W 2420/40; B60W 2552/50; B60W 2554/4029; B60Y 2400/3042
  See application file for complete search history.

(56) References Cited

U.S. PATENT DOCUMENTS

| | | | | |
|---|---|---|---|---|
| 2003/0051936 A1* | 3/2003 | Ishizaki | ................ | B60R 21/38 180/274 |
| 2004/0182629 A1* | 9/2004 | Takahashi | ........... | B60R 21/0132 180/274 |
| 2005/0093540 A1* | 5/2005 | Merrick | ............. | B60R 21/0136 324/207.22 |
| 2006/0212201 A1* | 9/2006 | Takahashi | ............... | B60R 21/36 701/45 |
| 2006/0232052 A1* | 10/2006 | Breed | ................ | B60R 21/0136 280/735 |
| 2007/0062749 A1* | 3/2007 | Wang | ................... | B62D 25/105 180/69.21 |
| 2007/0125589 A1* | 6/2007 | Murphy | ................ | B60R 21/013 180/274 |
| 2008/0077328 A1* | 3/2008 | Simmons | ............... | G08G 1/166 340/436 |
| 2008/0093150 A1* | 4/2008 | Schramm | ................ | B60R 21/38 180/274 |
| 2011/0282538 A1* | 11/2011 | Tamura | ................... | B60R 21/38 180/69.21 |
| 2013/0192917 A1* | 8/2013 | Matsuda | ................ | B60R 21/38 180/274 |
| 2013/0218419 A1* | 8/2013 | Lind | ...................... | B60R 21/00 701/45 |
| 2014/0132404 A1* | 5/2014 | Katoh | ................... | B60R 21/013 340/436 |
| 2015/0000994 A1* | 1/2015 | McLundie | .............. | B60R 21/34 180/274 |
| 2015/0224956 A1* | 8/2015 | Takenaka | ................ | B60R 21/36 73/862.381 |
| 2016/0375899 A1* | 12/2016 | Takenaka | .............. | B60W 10/18 701/41 |
| 2018/0194315 A1* | 7/2018 | Wakabayashi | ...... | B60R 21/0134 |
| 2019/0158765 A1* | 5/2019 | Kuybeda | ............ | H04N 5/22521 |
| 2020/0047708 A1* | 2/2020 | Umezawa | ........... | B60R 21/0134 |
| 2020/0047709 A1* | 2/2020 | Gunji | .................... | B60W 30/08 |
| 2020/0062202 A1* | 2/2020 | Umezawa | ................ | B60R 21/38 |
| 2020/0198572 A1* | 6/2020 | Kim | ...................... | G06V 20/56 |
| 2020/0262384 A1* | 8/2020 | Cho | ....................... | G08G 1/166 |
| 2021/0101549 A1* | 4/2021 | Cho | ........................ | B60R 21/34 |
| 2021/0138986 A1* | 5/2021 | Freienstein | ......... | B60R 21/0136 |

FOREIGN PATENT DOCUMENTS

| | | |
|---|---|---|
| DE | 102005001457 A1 | 8/2005 |
| DE | 102004054072 A1 | 5/2006 |
| DE | 102006047629 A1 | 9/2007 |
| DE | 112016004692 T5 | 6/2018 |
| DE | 102017206293 A1 | 10/2018 |
| JP | 2005053387 A * | 3/2005 |
| KR | 100554088 B1 * | 2/2006 |
| KR | 20120051137 A * | 5/2012 |

* cited by examiner

SYSTEM AND METHOD FOR PROTECTING PEDESTRIAN UPON A COLLISION WITH A VEHICLE

CROSS-REFERENCE TO RELATED APPLICATION

This application claims priority from and the benefit of Korean Patent Application No. 10-2020-0056440, filed on May 12, 2020, which is hereby incorporated by reference for all purposes as if set forth herein.

BACKGROUND

Field

Exemplary embodiments of the present disclosure relate to an apparatus/system for protecting a pedestrian and a control method thereof, and more particularly, to an apparatus for protecting a pedestrian, which identifies a pedestrian in front of a vehicle through an active sensor to determine whether the pedestrian is a hood lift target, detects a collision occurring in a vehicle through a passive sensor, determines whether the detected collision is a hood lift target collision, and drives a protection module only when the detected collision is the hood lift target collision, and a control method thereof.

Discussion of the Background

In the Republic of Korea, in accordance with the pedestrian collision safety regulations, when a vehicle collides with a pedestrian and thus a second collision occurs in which the head of the pedestrian collides with a vehicle bonnet, a pedestrian head injury value (HTC) is regulated and different structural collision characteristics are required according to each head model of an adult and a child.

The most important factor among such collision characteristics is that the head injury value (HTC) needs to have an overall uniform value of 1,000 or less for an entire area and a maximum deformation amount needs to be minimized in the event of a collision in consideration of a packaging state in an engine room.

Accordingly, in designing a vehicle bonnet, in addition to stiffness basically required by vehicle characteristics, a design aspect for aesthetic appearance as well as a shock absorption function and the like for coping with pedestrian collisions are being considered.

Meanwhile, with the development of vehicles, various convenience specifications are being developed. Particularly, there is an increasing interest in the safety of vehicles for protecting passengers in the event of an accident such as a collision. Accordingly, there has been developed a safety system that improves the safety of passengers through precautions before a vehicle collision.

Recently, there is an increasing interest not only for the safety of a driver who drives a vehicle, but also for the safety of a pedestrian who collides with a vehicle without any protective equipment.

Particularly, a pedestrian protection system is a device that identifies pedestrians around a vehicle and protects them in the event of a collision.

Pedestrian protection systems in the related art identify pedestrians and objects by using information from passive sensors such as acceleration sensors, pressure sensors, and optical fiber sensors, and control hood lifts (airbags, restraint devices, and the like) in the event of a collision, thereby protecting a pedestrian who collides with a vehicle.

The background art of the present disclosure is disclosed in Korean Patent Application Laid-Open No. 10-2008-0101483 (published on Nov. 21, 2008 and entitled "System for Protecting Pedestrian of Automobile and the Control Method").

SUMMARY

Such pedestrian protection systems have a problem that, due to the characteristics of a physical quantity (acceleration, pressure, and the like) detected by a passive sensor, large animals such as roe deer and certain objects (trees, telephone poles, and the like) having stiffness and weight similar to those of a pedestrian are difficult to discriminate from pedestrians, so the hood lifts (airbags, and the like) abnormally operate even in the event of a collision with the certain objects other than the pedestrians.

Various embodiments are directed to providing an apparatus for protecting a pedestrian, which identifies a pedestrian in front of a vehicle through an active sensor to determine whether the pedestrian is a hood lift target, detects a collision occurring in a vehicle through a passive sensor, determines whether the detected collision is a hood lift target collision, and drives a protection module only when the detected collision is the hood lift target collision, and a control method thereof.

An apparatus for protecting a pedestrian in accordance with an aspect of the present disclosure may include: a front object detection unit configured to detect an object in front of a vehicle; a collision detection unit configured to detect a collision of a vehicle; a protection module driving unit configured to drive a protection module for protecting a pedestrian when the pedestrian collides with the vehicle; and a control unit configured to determine the front object as a hood lift target on the basis of a detection result of the front object detection unit, to determine the collision as a hood lift target collision on the basis of a detection result of the collision detection unit, and to operate the protection module driving unit in case of the hood lift target collision of the hood lift target.

In the present disclosure, the front object detection unit may include an FIR thermal imaging camera.

In the present disclosure, the control unit may compensate for outside air temperature for intensity of infrared rays of the front object inputted from the FIR thermal imaging camera, and determine the front object as the hood lift target when an integral value obtained by integrating the intensity of the infrared rays is equal to or greater than a set intensity.

In the present disclosure, the collision detection unit may include magnetic field sensors that are arranged at center and left and right sides of a front bumper, respectively, to each detect a change to a magnetic field according to deformation of a bumper skin due to a collision.

In the present disclosure, the control unit may calculate stiffness and mass of a collision object by reflecting a vehicle speed on the basis of a current change amount inputted from the magnetic field sensor and a current amount change pattern, and determine the collision as the hood lift target collision when the collision object is a pedestrian on the basis of the stiffness and mass.

In the present disclosure, when the stiffness of the collision object is included in a predetermined range and the mass thereof is equal to or greater than a set value, the control unit may identify the collision object as a pedestrian.

In the present disclosure, the control unit may independently determine whether collision objects are pedestrians with respect to the magnetic field sensors arranged at the center and the left and right sides of the front bumper, and determine the collision as the hood lift target collision when any one of the collision objects is the pedestrian.

In the present disclosure, the control unit may determine whether the collision is the hood lift target collision when the front object is determined as the hood lift target, and operate the protection module driving unit when the collision is determined as the hood lift target collision.

A control method of an apparatus for protecting a pedestrian in accordance with another aspect of the present disclosure may include steps of: determining, by a control unit, a hood lift target on the basis of a detection result of a front object detection unit; determining, by the control unit, a hood lift target collision on the basis of a detection result of a collision detection unit; and operating, by the control unit, a protection module driving unit when a front object is the hood lift target and a collision is the hood lift target collision.

In the present disclosure, the step of determining the hood lift target may include steps of: compensating for, by the control unit, outside air temperature for intensity of infrared rays of the front object inputted from an FIR thermal imaging camera serving as the front object detection unit, and comparing an integral value obtained by integrating the intensity of the infrared rays with a set intensity to identify a pedestrian target; and determining, by the control unit, the pedestrian target as the hood lift target when the control unit identifies the pedestrian target and the integral value is equal to or greater than the set intensity.

In the present disclosure, the step of determining the hood lift target collision may include steps of: calculating, by the control unit, stiffness and mass of a collision object by reflecting a vehicle speed on the basis of a current change amount inputted from a magnetic field sensor serving as the collision detection unit and a current amount change pattern, and identifying a pedestrian collision on the basis of the stiffness and mass; and determining, by the control unit, the pedestrian collision as the hood lift target collision when the control unit identifies the pedestrian collision and the collision object is a pedestrian.

In the present disclosure, in the step of identifying the pedestrian collision, when the stiffness of the collision object is included in a predetermined range and the mass thereof is equal to or greater than a set value, the control unit determines the collision as the pedestrian collision.

A control method of an apparatus for protecting a pedestrian in accordance with further another aspect of the present disclosure may include steps of: determining, by a control unit, a hood lift target on the basis of a detection result of a front object detection unit; determining, by the control unit, a hood lift target collision on the basis of a detection result of a collision detection unit in case of the hood lift target; and operating, by the control unit, a protection module driving unit in case of the hood lift target collision.

In the present disclosure, the step of determining the hood lift target may include steps of: compensating for, by the control unit, outside air temperature for intensity of infrared rays of the front object inputted from an FIR thermal imaging camera serving as the front object detection unit, and comparing an integral value obtained by integrating the intensity of the infrared rays with a set intensity to identify a pedestrian target; and determining, by the control unit, the pedestrian target as the hood lift target when the control unit identifies the pedestrian target and the integral value is equal to or greater than the set intensity.

In the present disclosure, the step of determining the hood lift target collision may include steps of: calculating, by the control unit, stiffness and mass of a collision object by reflecting a vehicle speed on the basis of a current change amount inputted from a magnetic field sensor serving as the collision detection unit and a current amount change pattern, and identifying a pedestrian collision on the basis of the stiffness and mass; and determining, by the control unit, the pedestrian collision as the hood lift target collision when the control unit identifies the pedestrian collision and the collision object is a pedestrian.

In the present disclosure, in the step of identifying the pedestrian collision, when the stiffness of the collision object is included in a predetermined range and the mass thereof is equal to or greater than a set value, the control unit determines the collision as the pedestrian collision.

The apparatus for protecting a pedestrian and the control method thereof in accordance with an aspect of the present disclosure identify a pedestrian in front of a vehicle through an active sensor to determine whether the pedestrian is a hood lift target, detect a collision occurring in a vehicle through a passive sensor, determine whether the detected collision is a hood lift target collision, and drive a protection module only when the detected collision is the hood lift target collision, so that it is possible to substantially prevent the malfunction of the apparatus and reduce the cost due to the malfunction.

DETAILED DESCRIPTION OF THE ILLUSTRATED EMBODIMENTS

Figure 1:
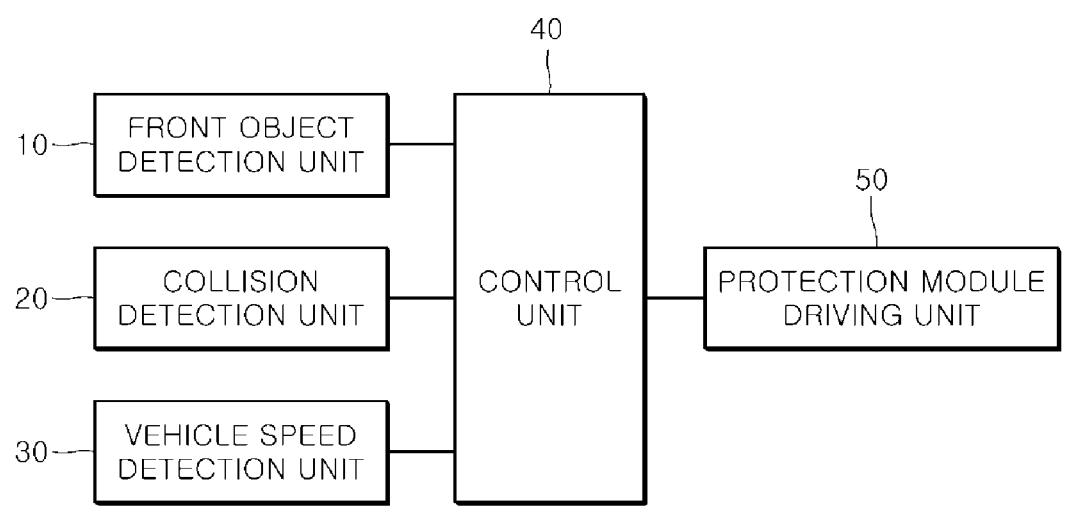
FIG. 1 is a block diagram illustrating a configuration of an apparatus/system for protecting a pedestrian in accordance with an embodiment of the present disclosure.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, an apparatus for protecting a pedestrian and a control method thereof in accordance with an embodiment of the present disclosure will be described below with reference to the accompanying drawings. In this process, the thickness of lines or the size of elements illustrated in the drawings may be exaggerated for the purpose of clarity and convenience of explanation. Furthermore, terms to be described later are terms defined in consideration of functions in the present disclosure and may be changed according to the intention of a user or an operator, or practice. Accordingly, such terms should be defined based on the disclosure over the present specification.

Figure 2:
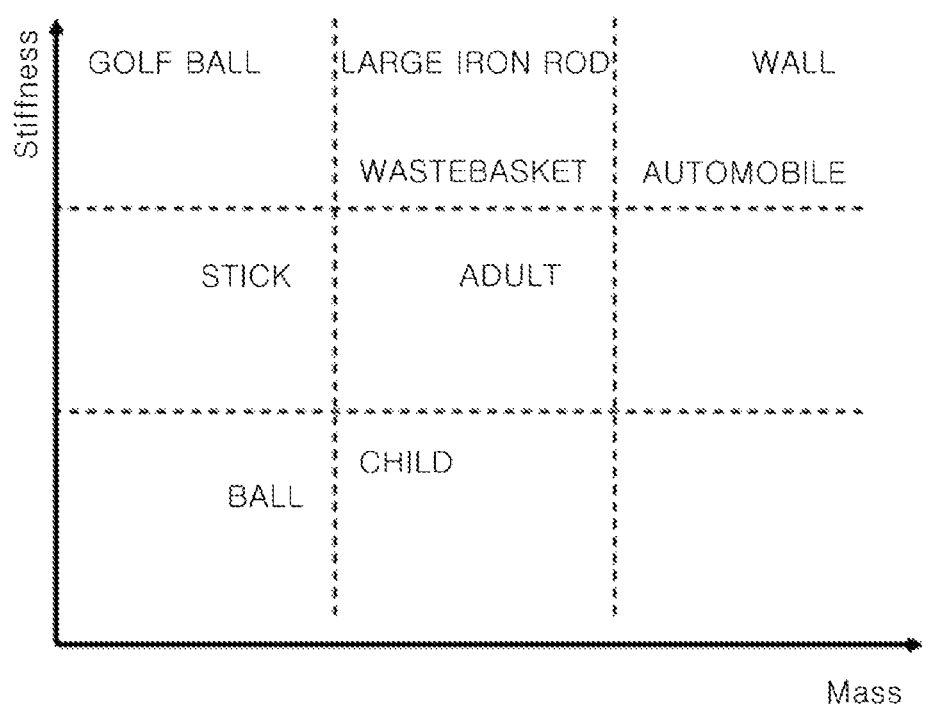
FIG. 2 is an exemplary diagram illustrating collision objects according to stiffness and weight for determining a pedestrian in the apparatus for protecting a pedestrian in accordance with an embodiment of the present disclosure.

FIG. 1 is a block diagram illustrating a configuration of an apparatus for protecting a pedestrian in accordance with an embodiment of the present disclosure, and FIG. 2 is an exemplary diagram illustrating collision objects according to stiffness and weight for determining a pedestrian in the apparatus for protecting a pedestrian in accordance with an embodiment of the present disclosure.

As illustrated in FIG. 1, the apparatus for protecting a pedestrian in accordance with an embodiment of the present disclosure may include a front object detection unit 10, a collision detection unit 20, a vehicle speed detection unit 30, a protection module driving unit 50, and a control unit 40.

The front object detection unit 10 is an active sensor that detects an object in front of a vehicle, and may include a far infrared (FIR) thermal imaging camera.

Accordingly, the front object detection unit 10 may detect infrared rays generated from the front object and provide the detected infrared rays to the control unit 40.

The collision detection unit 20 is a passive sensor that detects a collision of a vehicle, and may include magnetic field sensors that are arranged at the center and left and right sides of a front bumper, respectively, to detect a change to a magnetic field according to deformation of a bumper skin due to a collision.

Accordingly, when a collision with the vehicle occurs, the collision detection unit 20 may detect a change to a magnetic field caused by a collision object and provide the detected change to the control unit 40 as the amount of current.

The protection module driving unit 50 may drive a protection module for protecting a pedestrian when the pedestrian collides with the vehicle occurs.

The protection module may include at least one of a hood lift and a pedestrian airbag.

The vehicle speed detection unit 30 detects a vehicle speed of the vehicle and provides the detected vehicle speed to the control unit 40 so that the control unit 40 may calculate the stiffness and mass of a collision object by reflecting the vehicle speed.

The control unit 40 may determine the front object as a hood lift target on the basis of the detection result of the front object detection unit 10, determine the collision as a hood lift target collision on the basis of the detection result of the collision detection unit 20, and operate the protection module driving unit 50 in the case of the hood lift target collision of the hood lift target.

Here, the control unit 40 may compensate, based on an outside air temperature, the intensity of the infrared rays of the front object inputted from the FIR thermal imaging camera serving as the front object detection unit 10, and determine the front object as the hood lift target when an integral value obtained by integrating the intensity of the infrared rays is equal to or greater than a set intensity.

In such a case, the control unit 40 may check whether the front object is a living thing or a non-living thing, and then check whether the living thing is an adult or a child when the front object is the living thing.

However, in the present disclosure, the hood lift target is an adult pedestrian, and the intensity of infrared rays of an adult is greater than that of a non-living thing or a child. Thus, when the integral value obtained by integrating the intensity of the infrared rays radiated from the front object is equal to or greater than a set intensity for determining an adult pedestrian, the control unit 40 may determine the front object as the hood lift target.

Furthermore, the control unit 40 may calculate the stiffness and mass of the collision object by reflecting the vehicle speed on the basis of the current change amount inputted from the magnetic field sensor serving as the collision detection unit 20 and a current amount change pattern, and determine the collision as the hood lift target collision when the collision object is an adult pedestrian on the basis of the stiffness and mass.

When a vehicle collides with a collision object, a bummer skin is deformed, the amount of current from a magnetic field sensor changes according to the mass of the collision object and also changes according to the stiffness of the collision object, resulting in current oscillation.

Accordingly, the control unit 40 may calculate the mass of the collision object on the basis of the current change amount, calculate the stiffness of the collision object on the basis of a pattern obtained by counting the change to the amount of current, and identify the collision object as the adult pedestrian when the stiffness of the collision object is included in a predetermined range and the mass thereof is equal to or greater than a set value as illustrated in FIG. 2.

Here, the control unit 40 may independently determine whether collision objects are adult pedestrians with respect to the magnetic field sensors arranged at the center and the left and right sides of the front bumper, and determine the collision as the hood lift target collision when any one of the collision objects is an adult pedestrian.

On the other hand, the control unit 40 may determine whether the collision is the hood lift target collision when the front object is determined as the hood lift target, and operate the protection module driving unit when the collision is determined as the hood lift target collision. That is, the control unit 40 may determine whether the front object is the hood lift target, and determine whether the collision is the hood lift target collision, and then operate the protection module driving unit 50.

As described above, the apparatus for protecting a pedestrian in accordance with the embodiment of the present disclosure identifies a pedestrian in front of a vehicle through an active sensor to determine whether the pedestrian is a hood lift target, detects a collision occurring in a vehicle through a passive sensor, determines whether the detected collision is a hood lift target collision, and drives a protection module only when the detected collision is the hood lift target collision, so that it is possible to substantially prevent the malfunction of the apparatus and reduce the cost due to the malfunction.

Figure 3:
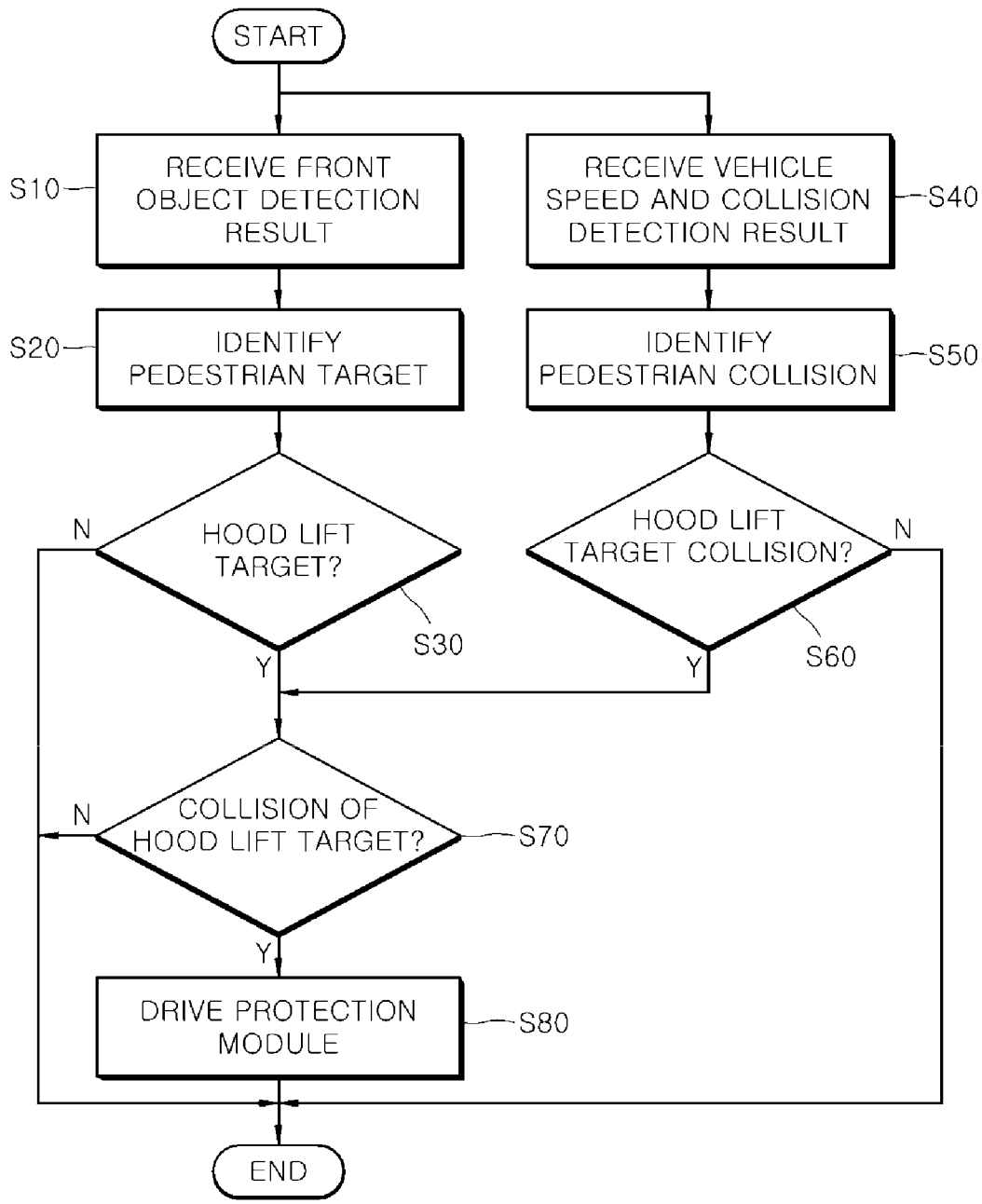
FIG. 3 is a flowchart for explaining a pedestrian protection method in accordance with an embodiment of the present disclosure.

FIG. 3 is a flowchart for explaining a pedestrian protection method in accordance with an embodiment of the present disclosure.

As illustrated in FIG. 3, in a control method of the apparatus for protecting a pedestrian in accordance with an embodiment of the present disclosure, first, the control unit 40 receives a detection result from the FIR thermal imaging camera serving as the front object detection unit 10 (S10).

After receiving the detection result from the FIR thermal imaging camera in step S10, the control unit 40 identifies a pedestrian target (S20).

In step S20, the control unit 40 compensates, based on an outside air temperature, the inputted intensity of the infrared rays of the front object, and then compares an integral value obtained by integrating the intensity of infrared rays with the set intensity to identify the pedestrian target.

In the present embodiment, the pedestrian target is an adult pedestrian, and the intensity of infrared rays of the adult pedestrian is greater than that of a non-living thing or a child. Thus, the control unit 40 may compare an integral value obtained by integrating the intensity of infrared rays radiated from a front object with a set intensity for determining the adult pedestrian, and identify the pedestrian target.

On the basis of the result of identifying the pedestrian target in step S20, the control unit 40 determines whether the pedestrian target is a hood lift target (S30).

When the pedestrian target is identified as an adult in step S30, the control unit 40 may determine that the pedestrian target is the hood lift target.

On the other hand, the control unit 40 performs the process of determining the hood lift target and simultaneously receives the vehicle speed and the collision detection result from the vehicle speed detection unit 30 and the magnetic field sensor serving as the collision detection unit 20, respectively (S40).

After receiving the collision detection result from the magnetic field sensor in step S40, the control unit 40 identifies a pedestrian collision on the basis of the current change amount and a current amount change pattern as the collision detection result (S50).

Here, the control unit 40 may calculate the stiffness and mass of the collision object by reflecting the vehicle speed on the basis of the current change amount inputted from the magnetic field sensor serving as the collision detection unit 20 and a current amount change pattern, and identify whether a collision is the pedestrian collision, on the basis of the stiffness and mass.

When a vehicle collides with a collision object, a bummer skin is deformed, the amount of current from a magnetic field sensor changes according to the mass of the collision object and also changes according to the stiffness of the collision object, resulting in current oscillation.

Accordingly, the control unit 40 may calculate the mass of the collision object on the basis of the current change amount, calculate the stiffness of the collision object on the basis of a pattern obtained by counting the change to the amount of current, and identify the collision object as the adult pedestrian when the stiffness of the collision object is included in the predetermined range and the mass thereof is equal to or greater than the set value as illustrated in FIG. 2.

On the basis of the result of identifying the pedestrian collision in step S50, the control unit 40 determines whether the pedestrian collision is the hood lift target collision (S60).

When the pedestrian collision is determined as the hood lift target collision in step S60, the control unit 40 may determine the pedestrian collision as the hood lift target collision.

Here, the control unit 40 may independently identify whether collision objects are adult pedestrians with respect to the magnetic field sensors arranged at the center and the left and right sides of the front bumper, and determine the pedestrian collision as the hood lift target collision when any one of the collision objects is an adult pedestrian.

Depending on the result of determining whether the pedestrian target is the hood lift target in step S30 and the result of determining whether the pedestrian collision is the hood lift target collision in step S60, the control unit 40 determines whether the collision is a collision of the hood lift target (S70).

When it is determined in step S70 that the hood lift target collision is a collision of the hood lift target, the control unit 40 drives the protection module driving unit 50 (S80).

Figure 4:
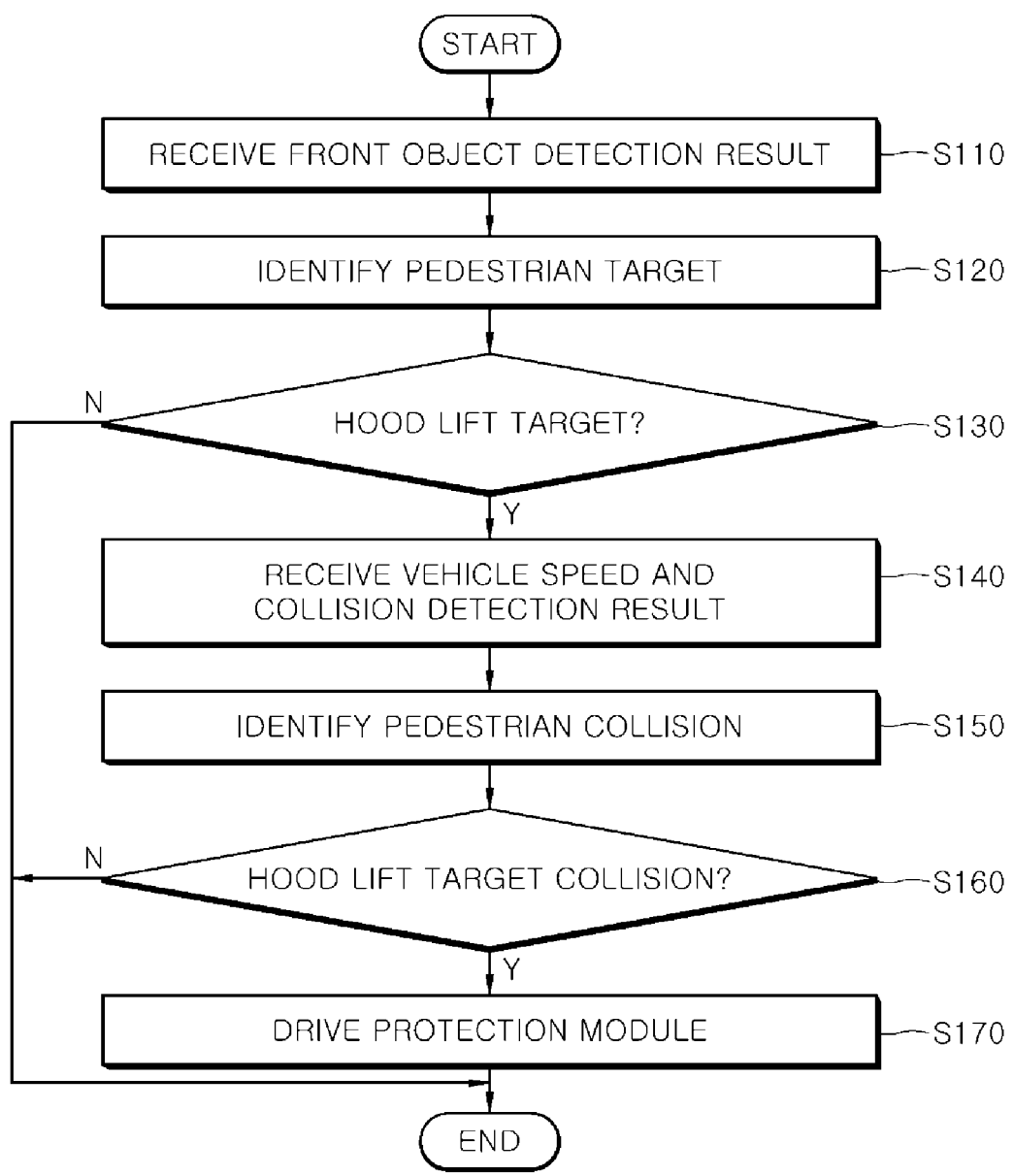
FIG. 4 is a flowchart for explaining a pedestrian protection method in accordance with another embodiment of the present disclosure.

FIG. 4 is a flowchart for explaining a pedestrian protection method in accordance with another embodiment of the present disclosure.

As illustrated in FIG. 4, in a control method of the apparatus for protecting a pedestrian in accordance with another embodiment of the present disclosure, first, the control unit 40 receives a detection result from the FIR thermal imaging camera serving as the front object detection unit 10 (S110).

After receiving the detection result from the FIR thermal imaging camera in step S110, the control unit 40 identifies a pedestrian target (S120).

In step S120, the control unit 40 compensates, based on an outside air temperature, the inputted intensity of the infrared rays of the front object, and then compares the integral value obtained by integrating the intensity of the infrared rays with the set intensity to identify the pedestrian target.

In the present embodiment, the pedestrian target is an adult pedestrian, and intensity of infrared rays of the adult pedestrian is greater than that of a non-living thing or a child. Thus, the control unit 40 may compare an integral value obtained by integrating the intensity of infrared rays radiated from a front object with a set intensity for determining the adult pedestrian, and identify the pedestrian target.

On the basis of the result of identifying the pedestrian target in step S120, the control unit 40 determines whether the pedestrian target is a hood lift target (S130).

When the pedestrian target is determined as an adult in step S130, the control unit 40 may determine that the pedestrian target is the hood lift target.

When it is determined in step S130 that the pedestrian target is the hood lift target, the control unit 40 receives the vehicle speed and the collision detection result from the vehicle speed detection unit 30 and the magnetic field sensor serving as the collision detection unit 20, respectively (S140).

After receiving the collision detection result from the magnetic field sensor in step S140, the control unit 40 identifies a pedestrian collision on the basis of the current change amount and a current amount change pattern as the collision detection result (S150).

Here, the control unit 40 may calculate the stiffness and mass of the collision object by reflecting the vehicle speed on the basis of the current change amount inputted from the magnetic field sensor serving as the collision detection unit 20 and a current amount change pattern, and identify whether a collision is the pedestrian collision, on the basis of the stiffness and mass.

When a vehicle collides with a collision object, a bummer skin is deformed, the amount of current from a magnetic field sensor changes according to the mass of the collision object and also changes according to the stiffness of the collision object, resulting in current oscillation.

Accordingly, the control unit 40 may calculate the mass of the collision object on the basis of the current change amount, calculate the stiffness of the collision object on the basis of the pattern obtained by counting the change to the amount of current, and identify the collision object as the adult pedestrian when the stiffness of the collision object is included in the predetermined range and the mass thereof is equal to or greater than the set value as illustrated in FIG. 2.

On the basis of the result of identifying the pedestrian collision in step S150, the control unit 40 determines whether the pedestrian collision is the hood lift target collision (S160).

When the pedestrian collision is determined as the hood lift target collision in step S160, the control unit 40 may determine the pedestrian collision as the hood lift target collision.

Here, the control unit 40 may independently identify whether collision objects are adult pedestrians with respect to the magnetic field sensors arranged at the center and the left and right sides of the front bumper, and determine the pedestrian collision as the hood lift target collision when any one of the collision objects is an adult pedestrian.

When it is determined in step S160 that the pedestrian collision is the hood lift target collision, the control unit 40 drives the protection module driving unit 50 (S170).

As described above, the control method of the apparatus for protecting a pedestrian in accordance with the embodiment of the present disclosure identifies a pedestrian in front of a vehicle through an active sensor to determine whether the pedestrian is a hood lift target, detects a collision occurring in a vehicle through a passive sensor, determines whether the detected collision is a hood lift target collision, and drives a protection module only when the detected collision is the hood lift target collision, so that it is possible to substantially prevent the malfunction of the apparatus and reduce the cost due to the malfunction.

The implementations described in the present specification may be implemented with a method or process, an apparatus, a software program, a data stream or signal, for example. Although discussed only in the context of a single form of implementation (for example, discussed only as a method), the discussed features may also be implemented as other forms (for example, an apparatus or a program). The apparatus may be implemented with appropriate hardware, software, firmware and the like. The method may be implemented in an apparatus such as a processor generally referring to a processing device including a computer, a microprocessor, an integrated circuit, or a programmable logic device. The processor includes a communication device such as a computer, a cellular phone, a portable/personal digital assistant (PDA), and other devices that facilitate communication of information between end users.

Although the present disclosure has been described with reference to the embodiments illustrated in the drawings, the embodiments of the disclosure are for illustrative purposes only, and those skilled in the art will appreciate that various modifications and equivalent other embodiments are possible.

Thus, the true technical scope of the disclosure should be defined by the following claims.

What is claimed is:

1. A system for protecting a pedestrian upon a collision with a vehicle, comprising:
   a front object detection unit configured to detect an object in front of the vehicle;
   a collision detection unit configured to detect the collision of the vehicle and including one or more magnetic field sensors arranged at a front bumper of the vehicle, each magnetic field sensor configured to detect a change to a magnetic field caused by deformation of a bumper skin of the front bumper due to the collision of the vehicle;
   a protection module driving unit configured to drive a protection module configured to protect the pedestrian when the pedestrian collides with the vehicle; and
   a control unit configured to:
      determine whether the detected object is a hood lift target;
      determine, based on the change to the magnetic field detected by the collision detection unit, whether the detected collision is a hood lift target collision; and
      in response to determining that the detected object is the hood lift target and the detected collision is the hood lift target collision, operate the protection module driving unit.

2. The system of claim 1, wherein the front object detection unit includes a far infrared (FIR) thermal imaging camera configured to capture an infrared ray of the detected object.

3. The system of claim 2, wherein the control unit is further configured to:
   compensate, based on an outside air temperature, an intensity of the captured infrared ray of the detected object; and
   determine, based on the compensated intensity of the infrared rays of the object, whether the detected object is the hood lift target.

4. The system of claim 1, wherein the control unit is further configured to:
   calculate a stiffness and mass of the detected object colliding with the vehicle by reflecting a vehicle speed based on a change to the magnetic field and a pattern of the change to the magnetic field; and
   determine that the collision is the hood lift target collision when the calculated stiffness and mass indicate that the detected object collided with the vehicle is a pedestrian.

5. The system of claim 4, wherein the control unit further is configured to determine that the detected object colliding with the vehicle is a pedestrian when the calculated stiffness is within a predetermined range and the calculated mass is equal to or greater than a predetermined value.

6. The system of claim 1, wherein the control unit is further configured to:
   control each of the magnetic field sensors to independently determine whether the object colliding with the vehicle is a pedestrian; and
   in response to determining that the object colliding with the vehicle is a pedestrian, determine that the collision is the hood lift target collision.

7. The system of claim 1, wherein the control unit is further configured to:
   in response to determining that the detected object is the hood lift target, determine whether the collision is the hood lift target collision; and
   in response to determining that the detected collision is the hood lift target collision, operate the protection module driving unit to drive the protection module.

8. A system for protecting a pedestrian upon a collision with a vehicle, comprising:
   a front object detection unit configured to detect an object in front of the vehicle;
   a collision detection unit configured to detect the collision of the vehicle;
   a protection module driving unit configured to drive a protection module configured to protect the pedestrian when the pedestrian collides with the vehicle; and a control unit configured to:
  determine whether the detected object is a hood lift target;
  determine whether the detected collision is a hood lift target collision; and
  in response to determining that the detected object is the hood lift target and the detected collision is the hood lift target collision, operate the protection module driving unit,
wherein the collision detection unit includes one or more magnetic field sensors arranged at a front bumper of the vehicle, each magnetic field sensor configured to detect a change to a magnetic field caused by deformation of a bumper skin of the front bumper due to the collision of the vehicle,
wherein the one or more magnetic field sensors include a plurality of magnetic field sensors respectively arranged at center, left and right portions of the front bumper of the vehicle.

9. A method of operating a system for protecting a pedestrian colliding with a vehicle, the method comprising:
  detecting an object in front of the vehicle;
  detecting a collision of the vehicle;
  determining whether the detected object is a hood lift target;
  determining whether the detected collision is a hood lift target collision; and
  in response to determining that the detected object is the hood lift target and the detected collision is the hood lift target collision, operating a protection module configured to protect the pedestrian colliding with the vehicle,
  wherein determining whether the detected collision is the hood lift target collision comprises:
    detecting, using a magnetic field sensor positioned at a front bumper of the vehicle, a change to a magnetic field caused by deformation of a bumper skin of the front bumper due to the collision of the vehicle; and
    determining, based on the detected change to the magnetic field, whether the detected collision is the hood lift target collision.

10. The method of claim 9, wherein determining whether the detected object is the hood lift target comprises:
  capturing, using a far infrared (FIR) thermal imaging camera, an infrared ray of the detected object;
  compensating, based an outside air temperature, an intensity of the captured infrared ray of the detected object; and
  determining, based on the compensated intensity of the infrared rays of the detected object, whether the detected object is the hood lift target.

11. The method of claim 9, wherein determining, based on the detected change to the magnetic field, whether the detected collision is the hood lift target collision comprises:
  calculating, based on the change to the magnetic field and a pattern of the change to the magnetic field, a stiffness and mass of the detected object collided with the vehicle;
  identifying, based on the calculated stiffness and mass, whether the detected collision is a pedestrian collision; and
  in response to identifying that the detected collision is a pedestrian collision, determining that the pedestrian collision is the hood lift target collision.

12. The method of claim 11, wherein identifying whether the detected object is the pedestrian collision comprises determining whether the stiffness of the collision object is within a predetermined range and the mass is equal to or greater than a predetermined value.

\* \* \* \* \*